United States Patent
Khalid et al.

(10) Patent No.: US 8,411,866 B2
(45) Date of Patent: Apr. 2, 2013

(54) DISTRIBUTION OF GROUP CRYPTOGRAPHY MATERIAL IN A MOBILE IP ENVIRONMENT

(75) Inventors: Mohamed Khalid, Cary, NC (US); Ciprian Pompiliu Popoviciu, Raleigh, NC (US); Kavitha Kamarthy, Milipitas, CA (US); Aamer Saeed Akhter, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1091 days.

(21) Appl. No.: 11/940,237

(22) Filed: Nov. 14, 2007

(65) Prior Publication Data

US 2009/0122985 A1    May 14, 2009

(51) Int. Cl.
- *H04K 1/00* (2006.01)
- *H04L 29/06* (2006.01)
- *H04L 9/32* (2006.01)
- *G06F 7/04* (2006.01)
- *G06F 15/16* (2006.01)
- *G06F 17/30* (2006.01)
- *G06F 15/173* (2006.01)

(52) U.S. Cl. ........ 380/279; 380/255; 380/273; 713/163; 713/171; 713/172; 713/169; 726/6; 726/7; 726/10; 709/238

(58) Field of Classification Search ................... 713/163; 380/279

See application file for complete search history.

(56) References Cited

U.S. PATENT DOCUMENTS

| | | | |
|---|---|---|---|
| 5,325,432 A * | 6/1994 | Gardeck et al. ............... | 380/273 |
| 5,592,552 A * | 1/1997 | Fiat ................................ | 713/163 |
| 6,038,322 A * | 3/2000 | Harkins ......................... | 380/279 |
| 6,256,733 B1 * | 7/2001 | Thakkar et al. ............... | 713/156 |
| 6,973,506 B2 * | 12/2005 | Ishiyama et al. .............. | 709/245 |
| 7,130,282 B2 * | 10/2006 | Black ............................ | 370/296 |

(Continued)

FOREIGN PATENT DOCUMENTS

WO    WO 2007005099 A2 *    1/2007

OTHER PUBLICATIONS

D. Johnson et al. "Mobility Support IPv6" Network Working Group RFC 3775 Jun. 2004 (165 pgs.).

(Continued)

*Primary Examiner* — Carolyn B Kosowski
(74) *Attorney, Agent, or Firm* — Weaver Austin Villeneuve & Sampson LLP

(57) ABSTRACT

In one embodiment, a Home Agent receives a Mobile IP registration request from a group member, where the group member is a Mobile Node. The Home Agent generates a mobility binding for the group member that associates the group member with a care-of address, wherein the group member is a member of one or more groups. The Home Agent generates a Mobile IP registration reply, where the Mobile IP registration reply identifies one or more key servers. Each of the one or more key servers serves at least one of the one or more groups and is adapted for distributing group cryptography material to members of each group that is served by the corresponding key server. The Home Agent sends the Mobile IP registration reply to the group member, thereby enabling the group member to obtain cryptography material for at least one of the one or more groups from at least one of the one or more key servers to enable the group member to use the cryptography group material to securely communicate with other group members.

26 Claims, 10 Drawing Sheets

U.S. PATENT DOCUMENTS

| | | | | |
|---|---|---|---|---|
| 7,228,431 | B2* | 6/2007 | Haddad et al. | 713/182 |
| 7,284,057 | B2* | 10/2007 | Kulkarni et al. | 709/227 |
| 7,298,847 | B2* | 11/2007 | Jing et al. | 380/247 |
| 7,334,125 | B1* | 2/2008 | Pellacuru | 713/163 |
| 7,409,549 | B1* | 8/2008 | Leung et al. | 713/168 |
| 7,426,213 | B2* | 9/2008 | Xu et al. | 370/401 |
| 7,443,824 | B1* | 10/2008 | Lipford et al. | 370/338 |
| 7,457,289 | B2* | 11/2008 | Wang | 370/392 |
| 7,502,331 | B2* | 3/2009 | Dommety et al. | 370/254 |
| 7,577,258 | B2* | 8/2009 | Wiseman et al. | 380/281 |
| 7,587,498 | B2* | 9/2009 | Leung et al. | 709/228 |
| 7,590,843 | B1* | 9/2009 | Khalil et al. | 713/171 |
| 7,647,036 | B2* | 1/2010 | Omae et al. | 455/411 |
| 7,689,822 | B2* | 3/2010 | Maggenti et al. | 713/151 |
| 7,707,310 | B2* | 4/2010 | Thubert et al. | 709/245 |
| 2001/0016492 | A1* | 8/2001 | Igarashi et al. | 455/433 |
| 2003/0233538 | A1* | 12/2003 | Dutertre | 713/151 |
| 2004/0114559 | A1* | 6/2004 | Wang | 370/338 |
| 2004/0120295 | A1* | 6/2004 | Liu et al. | 370/338 |
| 2004/0190542 | A1* | 9/2004 | Ono et al. | 370/432 |
| 2004/0205211 | A1* | 10/2004 | Takeda et al. | 709/230 |
| 2005/0198506 | A1* | 9/2005 | Qi et al. | 713/170 |
| 2006/0036733 | A1* | 2/2006 | Fujimoto et al. | 709/225 |
| 2006/0104247 | A1* | 5/2006 | Dommety et al. | 370/338 |
| 2006/0271780 | A1* | 11/2006 | Oswal et al. | 713/163 |
| 2006/0291660 | A1* | 12/2006 | Gehrmann et al. | 380/277 |
| 2007/0140245 | A1* | 6/2007 | Anjum et al. | 370/390 |
| 2007/0143600 | A1* | 6/2007 | Kellil et al. | 713/163 |
| 2007/0150742 | A1* | 6/2007 | Cukier et al. | 713/182 |
| 2008/0130577 | A1* | 6/2008 | Park et al. | 370/331 |
| 2008/0298592 | A1* | 12/2008 | Khalid et al. | 380/278 |
| 2009/0116651 | A1* | 5/2009 | Liang et al. | 380/278 |
| 2009/0285181 | A1* | 11/2009 | Nikander et al. | 370/331 |
| 2010/0122084 | A1* | 5/2010 | Liu | 713/163 |

OTHER PUBLICATIONS

Cisco Systems Data Sheet, "Cisco Group Encrypted Transport VPN: Tunnel-less VPN Delivering Encryption and Authentication for the WAN," pp. 1-5, 2006.

Cisco Systems, "Group Encrypted Transport VPN," pp. 1-2, Sep. 13, 2007.

* cited by examiner

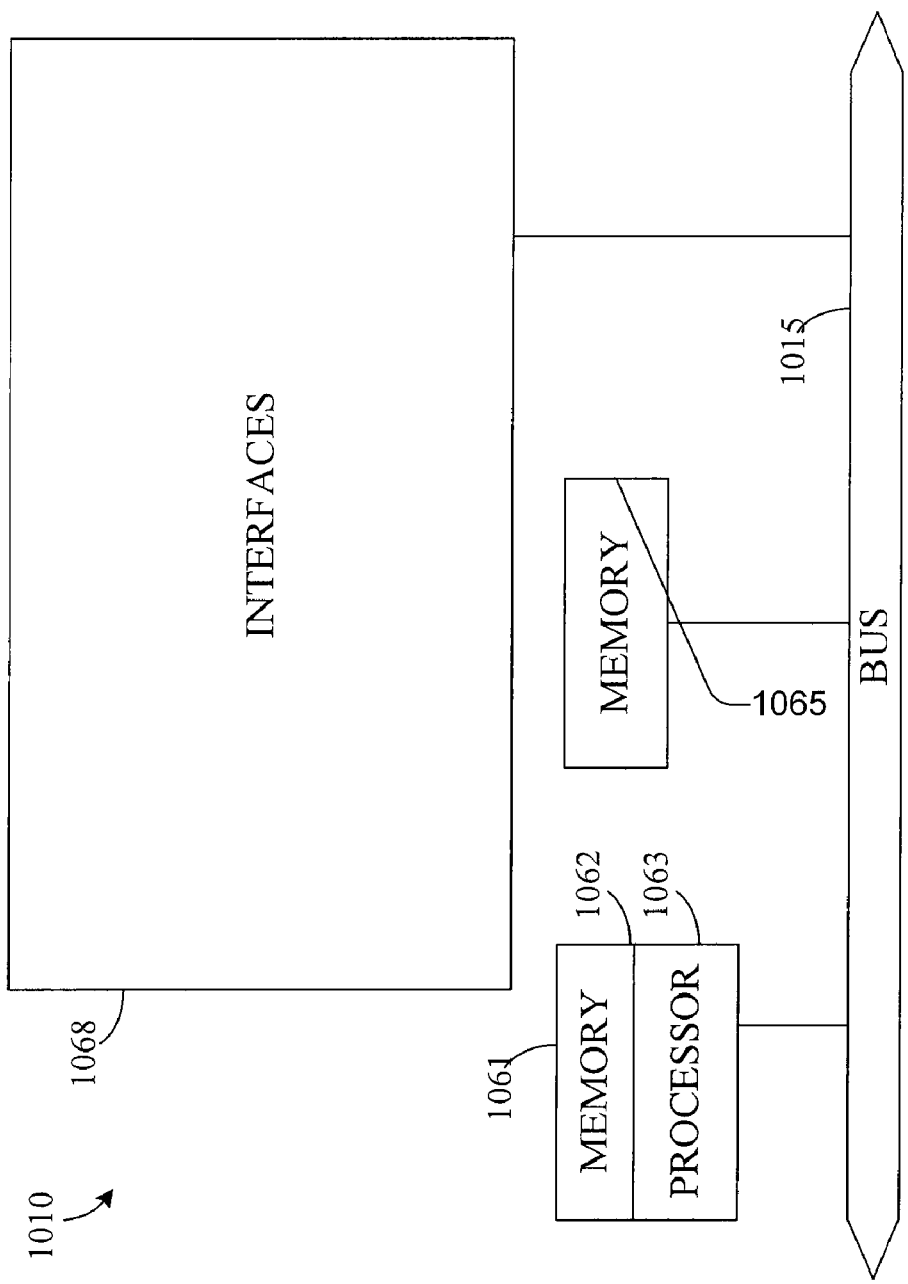

DISTRIBUTION OF GROUP CRYPTOGRAPHY MATERIAL IN A MOBILE IP ENVIRONMENT

BACKGROUND

1. Technical Field

The present disclosure relates generally to methods and apparatus for distributing cryptography material to group members that operate as Mobile Nodes in a Mobile IP environment in order to facilitate secured communication among the Mobile Nodes.

2. Description of the Related Art

In a Mobile IP environment, communications between a Home Agent and a Mobile Node is typically secured using a cryptography key that is shared between the two devices. A cryptography key may include a shared key or certificate that is shared between two different devices to enable communications to be secured using a cryptography technique such as Internet Protocol Security (IPSec). For example, a Mobile Node and a corresponding Home Agent may both be statically configured with a shared key. The Mobile Node and the Home Agent may thereafter secure communications between the two devices with the shared key.

Cryptography enabled transport such as Group Encrypted Transport (GET) can be used to enable a group of subscribers to communicate securely over a private or publicly accessible network. Such architectures can sometimes include a key server that manages the deployment of cryptographic information including group keys within the group to the group of subscribers (e.g., group members). As such, key server protocols provide for various means of updating and distributing cryptographic information within the group.

BRIEF DESCRIPTION OF THE DRAWINGS

FIG. 10 is a diagrammatic representation of an example router in which various embodiments may be implemented.

DESCRIPTION OF EXAMPLE EMBODIMENTS

Figure 1:
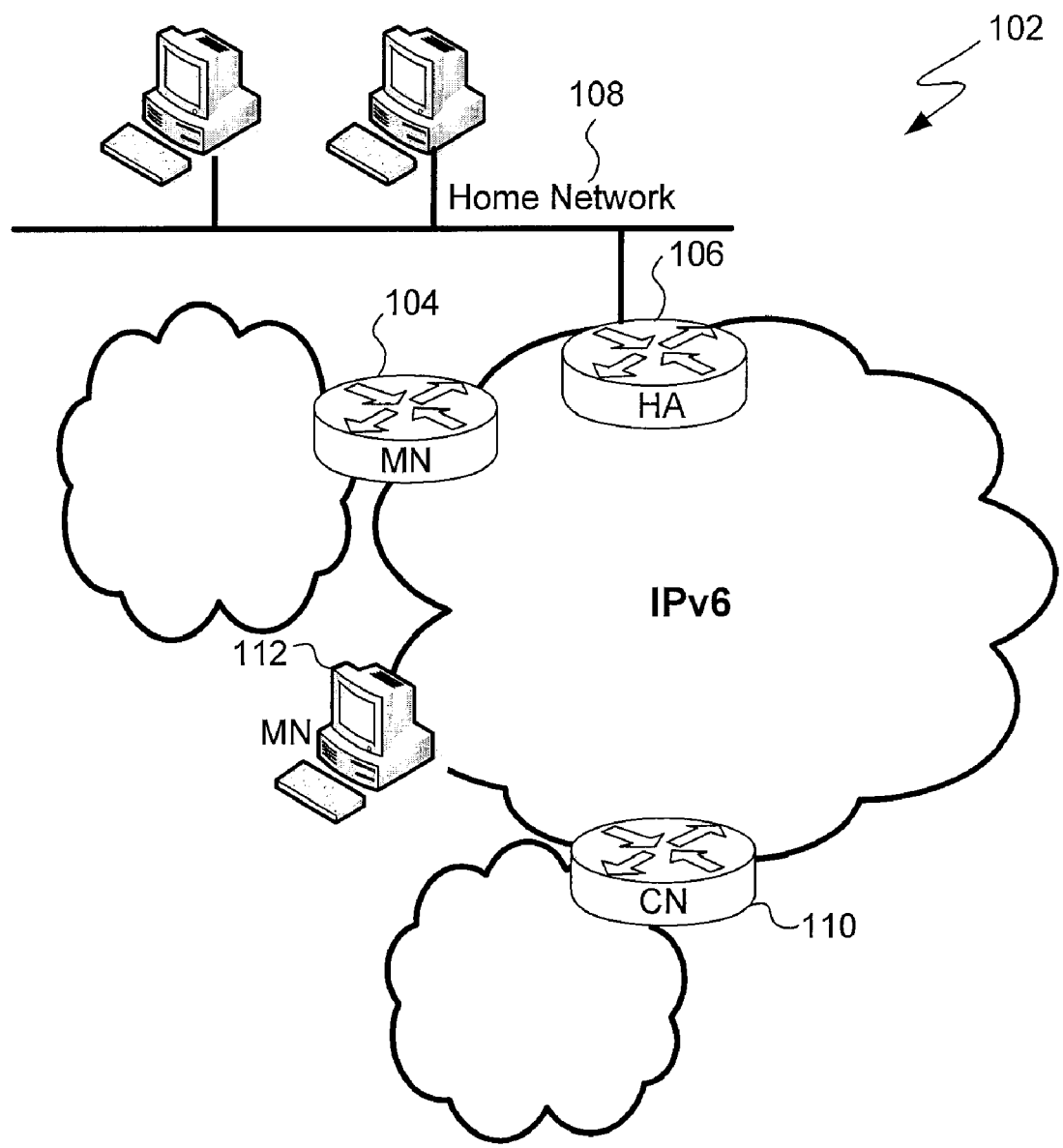
FIG. 1 is an example Mobile IP environment.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a Home Agent receives a Mobile IP registration request from a group member, where the group member is a Mobile Node. The Home Agent generates a mobility binding for the group member that associates the group member with a care-of address, wherein the group member is a member of one or more groups. The Home Agent generates a Mobile IP registration reply, where the Mobile IP registration reply identifies one or more key servers. Each of the one or more key servers serves at least one of the one or more groups and is adapted for distributing group cryptography material to members of each group that is served by the corresponding key server.

The Home Agent sends the Mobile IP registration reply to the group member, thereby enabling the group member to obtain cryptography material for at least one of the one or more groups from at least one of the one or more key servers to enable the group member to use the cryptography group material to securely communicate with other group members.

Specific Example Embodiments

Communications between a Home Agent and a Mobile Node are secured using a shared key that is typically statically configured on both the Home Agent and the Mobile Node. Recently, keys that are shared between a Home Agent and Mobile Node have also been dynamically distributed. However, this cryptography relationship is between only two nodes.

Two Mobile Nodes may similarly securely communicate with each other using a pair-wise cryptography relationship. However, since more than two Mobile Nodes may wish to communicate with one another, this cryptography relationship is not optimal. The disclosed embodiments enable group cryptography information to be optimally and efficiently distributed among a group of Mobile Nodes.

Group Encrypted Transport (GET) offers an efficient framework for any-to-any secured communication using group based cryptography techniques. This framework allows for subscribers, also known as group members (GMs), to securely communicate with each other.

Group Encrypted Transport (GET) enables a key server to distribute common cryptography material to a group of nodes. Each of the nodes in the group of nodes may thereafter encrypt communications transmitted among one another using the group cryptography material. The group cryptography material may include a cryptography group key, as well as other information such as policy information. However, GET assumes that the key server and the nodes in the group of nodes are static (i.e., not mobile).

In order for a node to register with a key server, the node may perform GET registration. GET may also be referred to as Group Domain of Interpretation (GDOI).

In one embodiment, key servers and nodes in a group of nodes may be mobile. Mobile Nodes in the group of nodes will be referred to in the following description as group members. In order to illustrate the manner in which Mobile Nodes may function as key servers and group members, the functioning of Mobile Nodes will be described with reference to FIG. 1.

FIG. 1 is an example Mobile IP environment 102. In a Mobile IPv6 network, a Mobile Node (MN) 104 may be associated with a particular Home Agent (HA) 106 in the Mobile Node's home network 108. The Home Agent 106 may be statically or dynamically assigned.

When a Correspondent Node (CN) 110 sends packets to the Mobile Node 104, the packets are typically addressed to the Mobile Node's home address. When the Mobile Node 104 roams from its home network to another location as shown at 112, the Mobile Node 104 may compose a Mobile IP registration request identifying the Mobile Node's care-of address and the Mobile Node's home address (or other identifier) and transmit the Mobile IP registration request to the Mobile Node's Home Agent 106. Upon successfully registering the Mobile Node 104 with the Home Agent 106, the Home Agent 106 typically establishes a binding between the Mobile Node 104 and its care-of address. Once the binding has been established, the Home Agent 106 may forward packets to the Mobile Node 104 at its care-of address.

The care-of address may be a collocated care-of address that the Mobile Node 104 has obtained. Alternatively, the care-of address may be an address associated with a Foreign Agent in a Mobile IPv4 network. (A network supporting Mobile IPv6 does not include Foreign Agents.)

In Mobile IPv4, the Mobile Node registers with a Home Agent by sending a Mobile IP registration request and receives a Mobile IP registration reply in response. In Mobile IPv6, the Mobile IP registration request is referred to as a Binding Update, while the Mobile IP registration reply is referred to as a Binding Acknowledgement. The examples set forth herein refer to a Mobile IPv6 environment. However, it is important to note that the disclosed embodiments are not limited to a particular version of Mobile IP.

Figure 2:
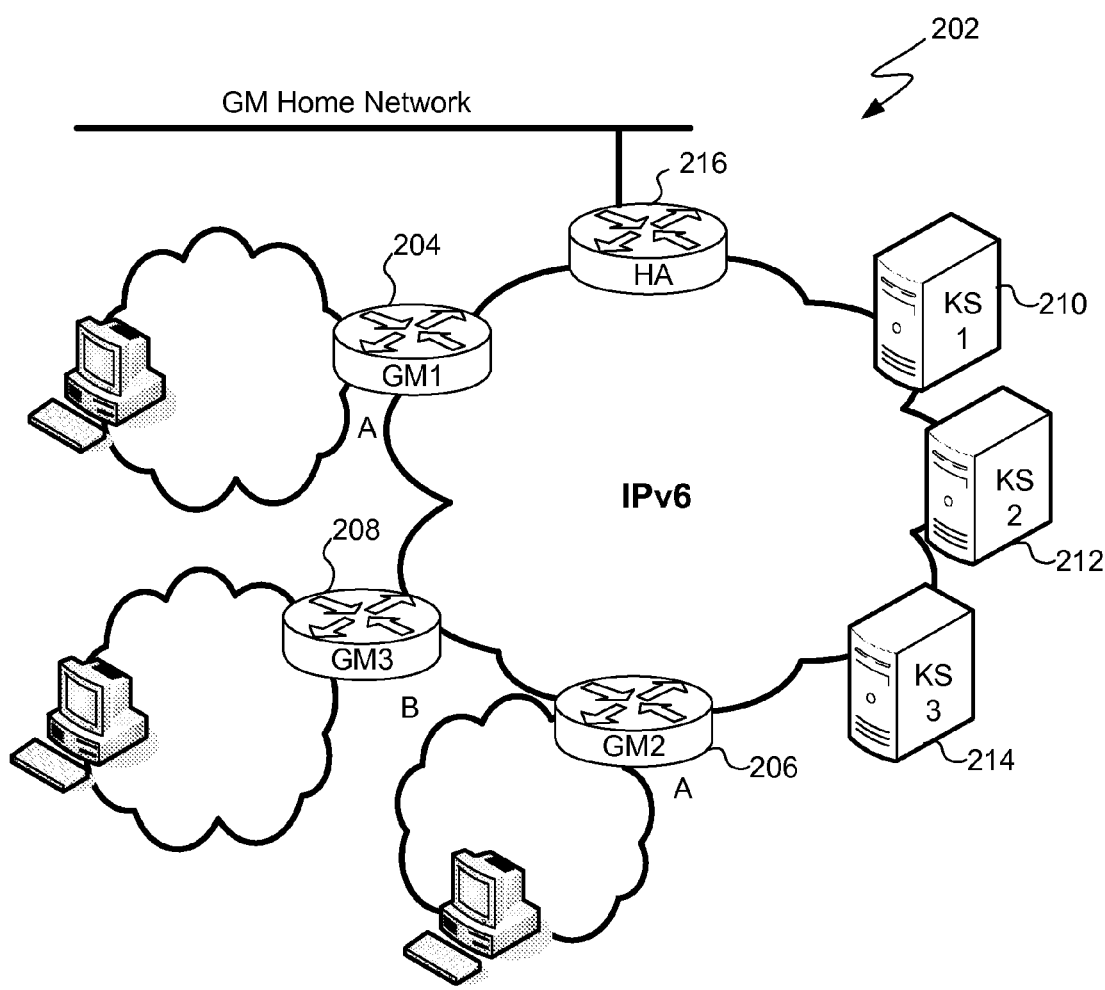
FIG. 2 is an example system implementing Group Domain of Interpretation.

FIG. 2 is an example system 202 implementing GDOI in a Mobile IP environment. The system 202 may support one or more groups. A group may specify a statically configured group, such as "Engineering" or "Accounting." Similarly, a group may specify a dynamically established group. Each group may include one or more group members. In this example, a plurality of group members are shown, which include group member 1 (GM1) 204, group member 2, (GM2) 206, and group member 3 (GM3) 208. Each group member may be a member of one or more groups. As set forth above, each of the group members may be mobile, and therefore may support Mobile IP.

The system 202 may also include one or more key servers. In this example, a plurality of key servers are shown, which include key server 1 (KS1) 210, key server 2 (KS2) 212, and key server 3 (KS3) 214. Each key server may support one or more groups. Two or more key servers may support the same group. Therefore, the plurality of key servers may provide overlapping coverage for one or more groups. Each of the key servers may be mobile, and therefore may support Mobile IP. Thus, the key servers may geographically separate.

A Home Agent 216 may support a plurality of Mobile Nodes, which may include one or more group members. More particularly, the Home Agent 216 need not support all of the group members in a particular group. Moreover, the Home Agent 216 may support group members in one or more groups. In this example, the Home Agent 216 supports the plurality of group members 204, 206, 208. As shown, the group members GM1 204 and GM2 206 belong to the same group, Group A, while the group member GM3 208 is a member of group B. In one embodiment, the group members are configured with a home prefix that is associated with the Home Agent 216. For example, the home prefix may be 2001:DB8:12::/64. Although a single Home Agent is shown in FIG. 2, it is important to note that the system 202 may include a plurality of Home Agents, which may include redundant Home Agents.

The Home Agent 216 (or another Home Agent) may also support one or more key servers. In this example, the Home Agent 216 supports the key servers KS1 210, KS2 212, and KS3 214. For example, the key servers may be configured with a key server Home Prefix. For example, the key server Home Prefix may be 2001:DB8:1::/64. Thus, the Home Agent 216 may identify a node as being a key server by its home prefix. In this manner, the key servers may belong to a virtual home network that is different from the home network assigned to the group members GM1 204, GM2 206, GM3 208. Of course, it is also possible that a node may provide both key server and Home Agent functionalities.

Each of the key servers KS1 210, KS2 212, and KS3 214 may be configured with the group(s) that it services. In this example, the key server KS1 210 supports group A, key server KS2 212 supports group B, and key server KS3 supports groups A and B. More particularly, each of the key servers may be statically configured and/or dynamically configured with the group(s) that it services. For example, a AAA server offering authorization, authentication, and accounting services may be used to dynamically allocate one or more groups to a particular key server. In addition, a key server may also be a group member of one or more of the groups that it services.

Figure 3A:
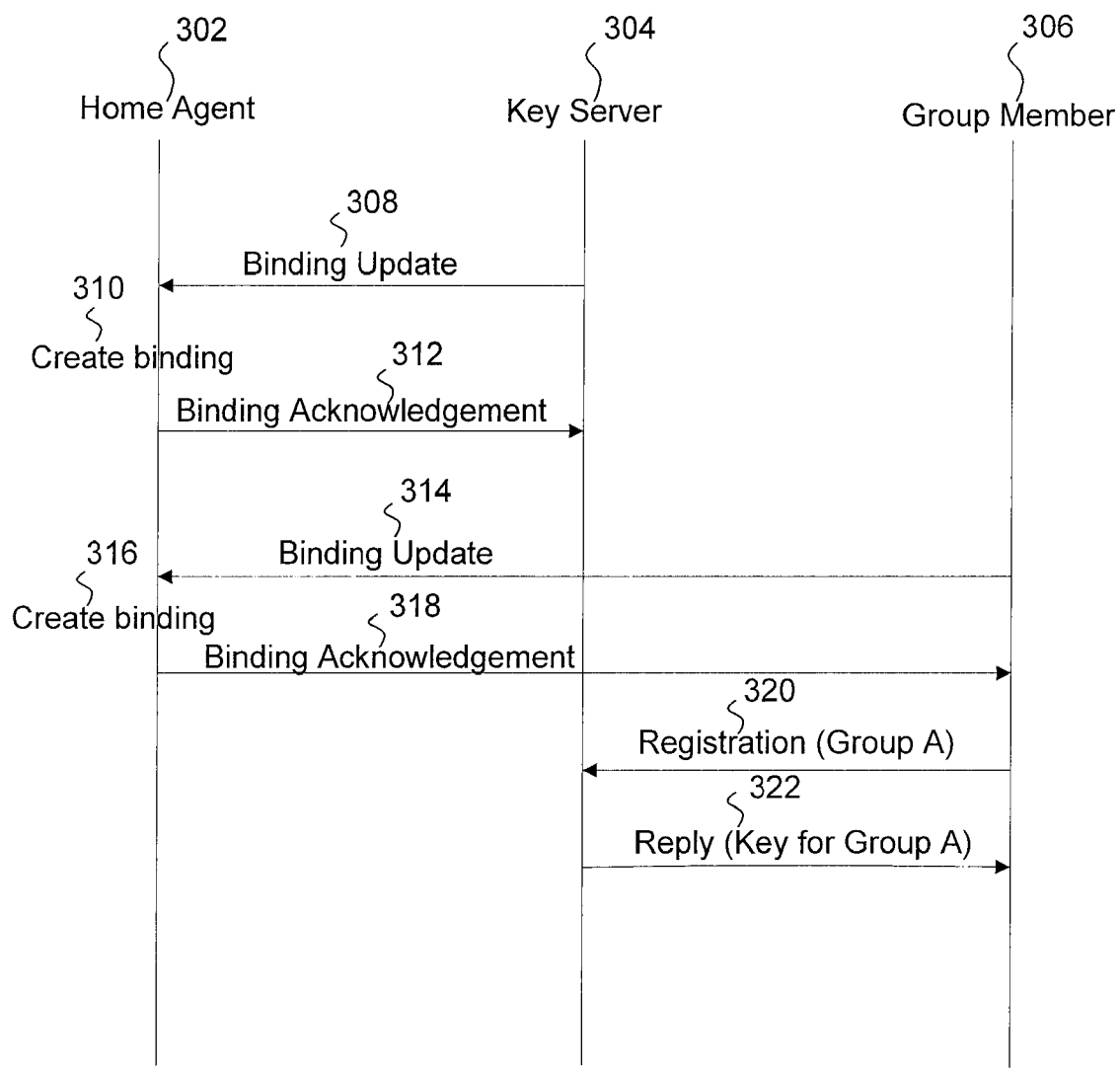
FIG. 3A is a transaction flow diagram illustrating an example method of implementing a Home Agent-Key Server call flow.

FIG. 3A is a transaction flow diagram illustrating a method of implementing a Home Agent-Key Server call flow. Steps performed by a Home Agent, a key server, and a group member are represented by corresponding vertical lines 302, 304, 306, respectively.

The key server may discover the Home Agent for the assigned key server home prefix (e.g., via Home Agent advertisements). For example the key server may send an Internet Control Message Protocol (ICMP) Home Agent discovery request to the Home Agent any cast address for the Mobile Node's home network, as set forth in RFC 3775. The key server may then perform Mobile IP registration to register with the Home Agent by sending a Binding Update to the Home Agent at 308. The key server may identify the group(s) that it services, its location and/or other capabilities in the Binding Update, as will be described in further detail below.

Upon receiving the Binding Update from the key server, the Home Agent may authenticate the key server (e.g., using a key shared between the Home Agent and the key server). If the key server has been successfully authenticated, the Home Agent may then create a binding between the key server and its care-of address at 310. The Home Agent may identify all devices that have registered on the key server subnet using the key server home prefix as key servers.

The Home Agent may then send a Binding Acknowledgement to the key server at 312, where the Binding Acknowledgement indicates whether the Mobile IP registration has been successful. In addition, the Binding Acknowledgment may advise the key server of one or more other key servers that have registered with the Home Agent (e.g., for which a mobility binding exists), as will be described in further detail below. For example, the Binding Acknowledgement (and/or other subsequent messages) may identify the key server(s) that service the "common group(s)" that are also serviced by the key server. These key servers may be identified by care-of address and/or home address. In addition, the Binding Acknowledgement (and/or subsequent messages) may identify the common group(s) supported by each of the identified key server(s). The Binding Acknowledgement may also identify a location associated with each of the identified key servers.

In addition, the group member(s) may discover a Home Agent for the home network (e.g., via Home Agent advertisements). For example the key server may send an Internet Control Message Protocol (ICMP) Home Agent discovery request to the Home Agent any cast address for the Mobile Node's home network, as set forth in RFC 3775. The group member may then register with the Home Agent by sending a Binding Update to the Home Agent at 314. The Binding Update may identify one or more groups of which the group member is a member. Thus, the group member(s) may register with the same Home Agent that supports the key server(s) that serve the group member(s).

Upon receiving the Binding Update from the group member, the Home Agent may authenticate the group member (e.g., using a key shared between the Home Agent and the group member). If the group member has been successfully authenticated, the Home Agent may create a binding between the group member and its care-of address at 316.

The Home Agent may then send a Binding Acknowledgement to the group member at 318, where the Binding Acknowledgement indicates whether the Mobile IP registration has been successful. In addition, the Binding Acknowledgement may identify one or more key servers that service the group(s) of which the group member is a member. For instance, the Home Agent may identify the key servers by searching through existing mobility bindings of all key servers that have registered with the Home Agent. The pertinent group(s) of which the group member is a member may be identified in association with each of the identified key servers. For example, the Binding Acknowledgement may include an IP address associated with each of these key servers, as well as a list of group(s) associated with each of the key servers. For instance, the IP address of a key server that is provided in a Binding Acknowledgement may be a Home Address or a care-of address of the key server. The Home Agent may also notify the group member of its membership in one or more group(s) to which the group member has been assigned by identifying the group(s) in the Binding Acknowledgement (e.g., where the Binding Update does not identify the group(s)). For example, a Binding Acknowledgement (and/or subsequent messages) may notify the group member of any group assignments or group assignment changes.

The group member may then register with the key server(s) for the group(s) of which the group member is a member, using GDOI, to obtain the group cryptography material. In one embodiment, the group member may identify the key server by a care-of address and/or a home address during the GDOI registration.

In this example, the group member registers with the key server for group A at 320. For example, the group member may send a message such as a GDOI registration message to the key server. This message may identify at least one group (e.g., group A) of which the group member is a member. The key server may confirm the group member's registration for group A by sending a GDOI reply message to the group member at 322. For example, the key server may send a GDOI reply message to the group member. The GDOI reply message may also include cryptography material such as a group cryptography key and/or policy for the group(s). In this example, the GDOI reply may include a group cryptography key for group A. The group members of a particular group (e.g., group A) may then encrypt (or decrypt) communications transmitted (or received) directly among one another using the group cryptography key(s) received from the key server.

As shown and described with reference to FIG. 3A, a key server may perform Mobile IP registration to register with a Home Agent before a group member performs Mobile IP registration to register with the Home Agent. However, it is important to note that key servers and group members may perform Mobile IP registration to register with a Home Agent at any time (upon roaming to a new location), and therefore a key server may perform Mobile IP registration to register with a Home Agent after a group member performs Mobile IP registration to register with the Home Agent. Thus, Mobile IP registration of a group member with a Home Agent is a process that is separate and distinct from the Mobile IP registration of a key server with a Home Agent. In order to illustrate these separate processes, the Mobile IP registration of a group member and the Mobile IP registration of a key server will be described with reference to FIG. 3B and FIG. 3C, respectively.

Figure 3B:
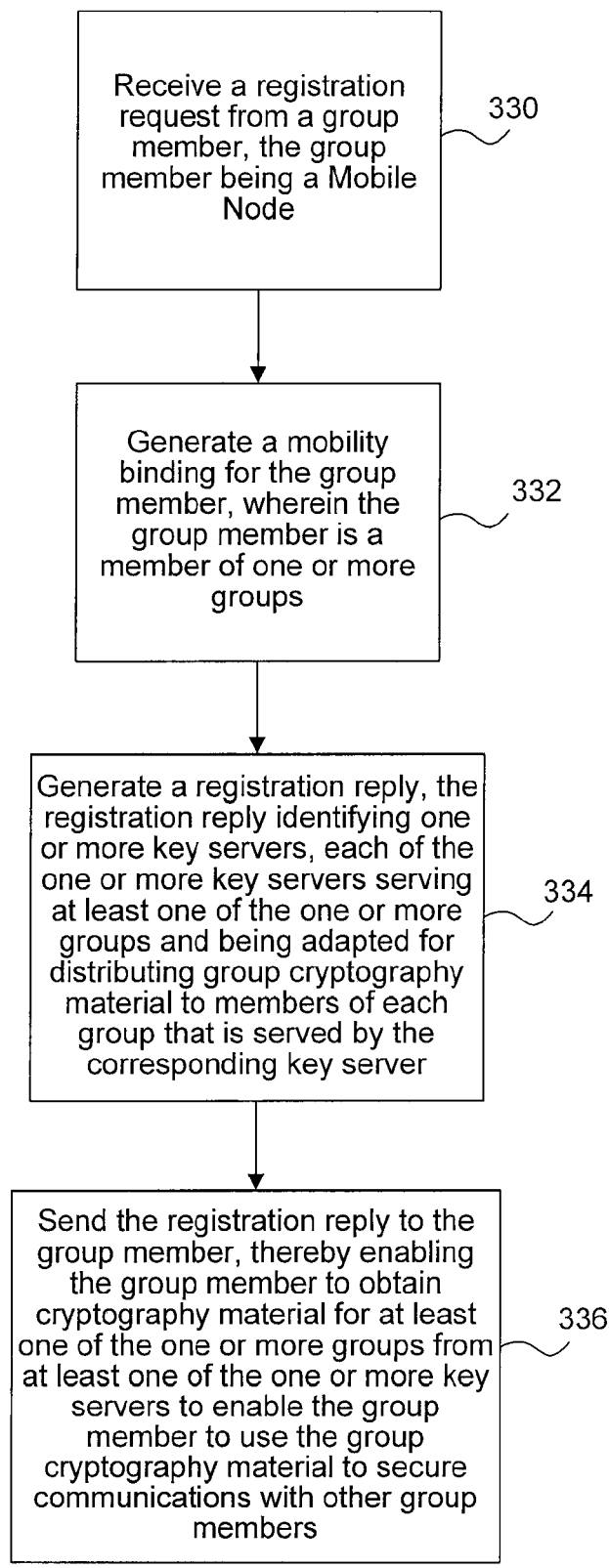
FIG. 3B is a process flow diagram illustrating an example method of registering a group member with a Home Agent.

FIG. 3B is a process flow diagram illustrating an example method of registering a group member with a Home Agent. A Home Agent may receive a Mobile IP registration request from a group member at 330, where the group member is a Mobile Node. For example, the group member may perform Mobile IP registration to register with the Home Agent when the group member has roamed to a new location. The Home Agent may generate a mobility binding for the group member that associates the group member with a care-of address, where the group member is a member of one or more groups at 332. The Home Agent may generate a Mobile IP registration reply at 334. The Mobile IP registration reply may identify one or more key servers, where each of the one or more key servers serves at least one of the one or more groups and is adapted for distributing cryptography material including one or more group key(s) to members of each group that is served by the corresponding key server. It is also important to note that a key server may also be responsible for sending any updates (i.e., rekey information) regarding group keys to group members when the group keys are modified, or in order to notify the group member of any key servers that have registered with the Home Agent after the group member has completed its Mobile IP registration. The Home Agent may send the Mobile IP registration reply to the group member at 336, thereby enabling the group member to obtain cryptography material including a group key for at least one of the one or more groups from at least one of the one or more key servers to enable the group member to securely communicate with other group members using the group key. In addition, as additional key servers perform Mobile IP registration to register with the Home Agent (as will be described in further detail below), the Home Agent may further update the pertinent group members, as appropriate. In this manner, a group member may automatically discover key server(s) servicing the group(s) to which the group member belongs.

Figure 3C:
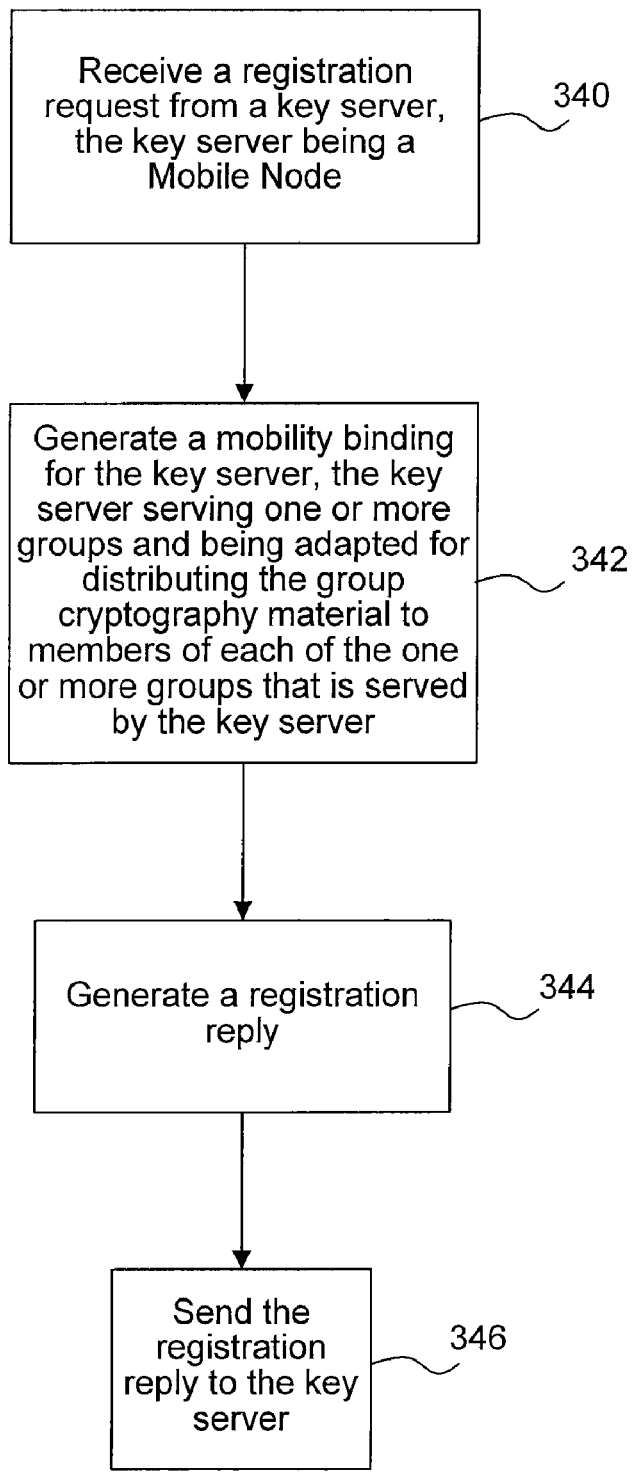
FIG. 3C is a process flow diagram illustrating an example method of registering a key server with a Home Agent.

FIG. 3C is a process flow diagram illustrating an example method of registering a key server with a Home Agent. The Home Agent may receive a Mobile IP registration request from a key server at 340, where the key server is a Mobile Node. The Home Agent may generate a mobility binding for the key server that associates the key server with a care-of address at 342, where the key server serves one or more groups and is adapted for distributing group cryptography material (e.g., including a group key) to members of each of the one or more groups that is served by the key server. The Home Agent may generate a Mobile IP registration reply at 344 and send the Mobile IP registration reply to the key server at 346.

Figure 4:
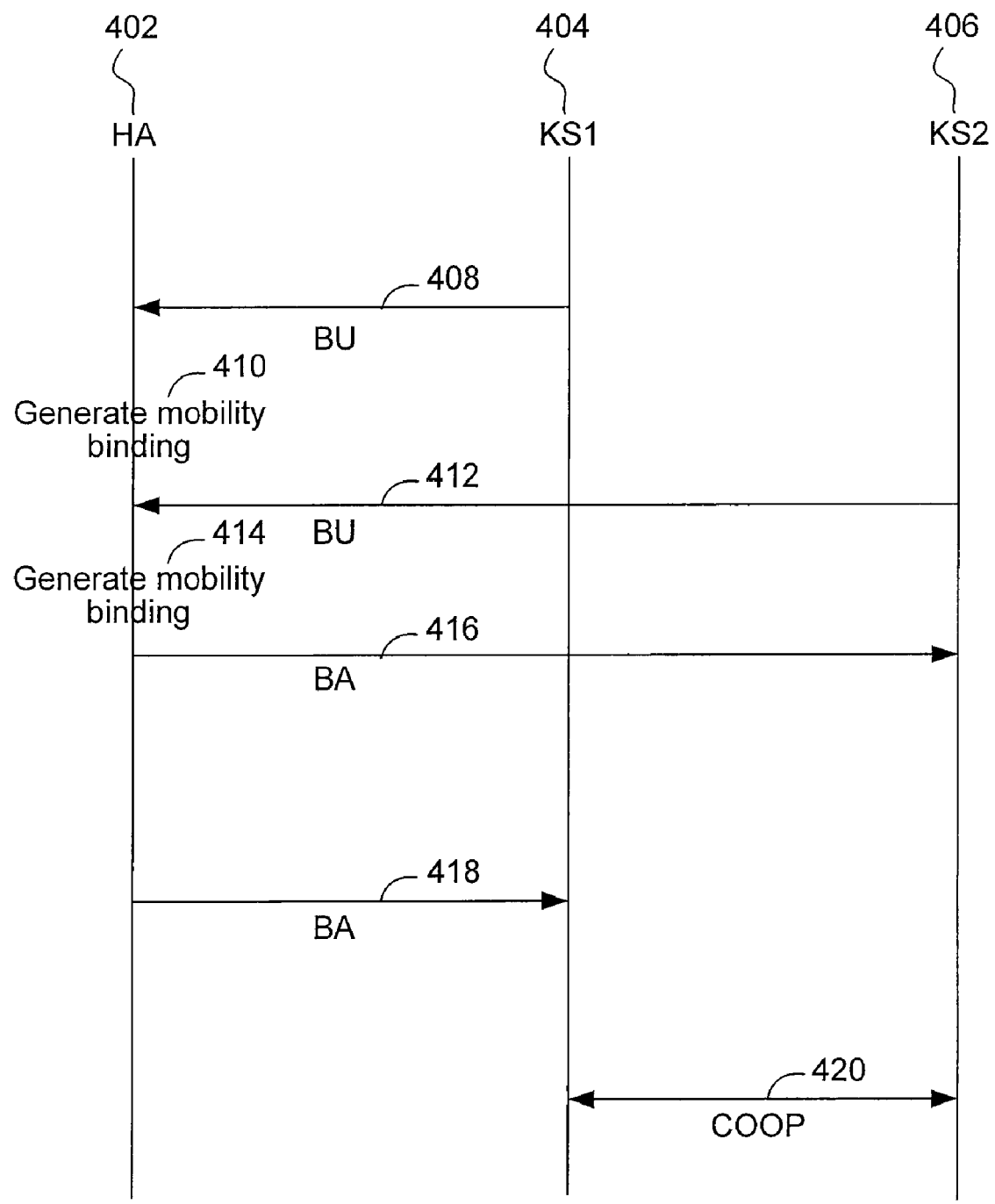
FIG. 4 is a transaction flow diagram illustrating an example method of performing dynamic key server discovery.

FIG. 4 is a transaction flow diagram illustrating an example method of performing dynamic key server discovery. Steps performed by a Home Agent, a first key server (KS1) and a second key server (KS2) are described with reference to vertical lines 402, 404, 406, respectively. The first key server, KS1, may perform Mobile IP registration to register with the Home Agent by sending a Binding Update (BU), to the Home Agent at 408. For example, KS1 may register as a Mobile Node on the key server home network. The Home Agent may generate a mobility binding between KS1 and its care-of address at 410. Similarly, the second key server, KS2, may perform Mobile IP registration to register with the Home Agent by sending a Binding Update (BU) to the Home Agent at 412. The Home Agent may then generate a mobility binding between KS2 and its care-of address at 414.

Where two or more key servers serve the same group, the Home Agent may notify the key servers of the identity of the other key server(s) serving the common group. The Home Agent may accomplish this notification by providing this information in a Binding Acknowledgement or other message.

As shown in this example, the Home Agent may send a Binding Acknowledgement to KS2, where the Binding Acknowledgement identifies KS1 (e.g., via IP address). The Binding Acknowledgement may further identify the common group(s) shared by KS1 and KS2.

Similarly, the Home Agent may send a Binding Acknowledgement to KS1, where the Binding Acknowledgement identifies KS2 (e.g., via IP address). The Binding Acknowledgement may further identify the common group(s) shared by KS1 and KS2. As additional key servers register with the Home Agent, the Home Agent may further update the pertinent key servers, as appropriate. In this manner, a key server may automatically discover other key server(s) servicing the same group(s). Once aware of one another, the key servers KS1 and KS2 may synchronize with each other using messages such as cooperative (COOP) messages.

In order to expand the information that can be provided in a Binding Update or Binding Acknowledgement, it is possible to include additional information in one or more options (i.e., extensions) that are appended to the Binding Update or Binding Acknowledgement. For example, the additional information may include a location, identify one or more groups, and/or identify one or more key servers. Example options will be described in further detail below with reference to FIGS. 5 and 6.

Figure 5:
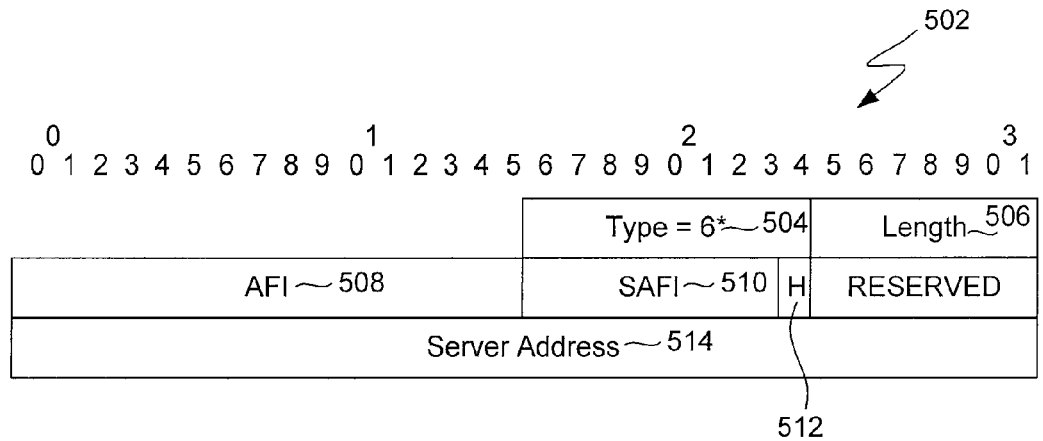
FIG. 5 is a diagram illustrating an example option that may be appended to a Binding Update or Binding Acknowledgement in order to identify a key server address.

FIG. 5 is a diagram illustrating an example option that may be appended to a Binding Update or Binding Acknowledgement in order to identify a key server address. The option 502 may include a type field 504 that identifies a type of the option 502. For instance, the type may indicate that the option 502 includes a key server address. A length field 506 may indicate the length (e.g., in bytes) of the option 502. An Address Family Information (AFI) field 508 may be used to indicate the Mobile IP version in which a key server address is represented. A Subsequent Address Family Identifier (SAFI) field 510 may be further used to distinguish the Mobile IP version that is used to represent the key server address.

The option 502 may further indicate whether the key server address is a Home Address or a care-of address. More particularly, a Home Address (H) field 512 may indicate whether the encoded address is a Home Address. For example, where the H field 512 is set to 1, this may indicate that the encoded server address is a Home Address. Similarly, where the H field 512 is set to 0, this may indicate that the encoded server address is a care-of address (CoA).

The option 502 may further include a key server address 514. The option 502 may indicate a version of IP in which the key server address is provided. In this example, the option 502 may indicate whether the key server address provided is an IPv4 address or an IPv6 address. In this example, where both the AFI and the SAFI are 1, the key server address is an IPv4 address. Where the AFI is 2 and the SAFI is 1, the key server address is an IPv6 address.

Figure 6:
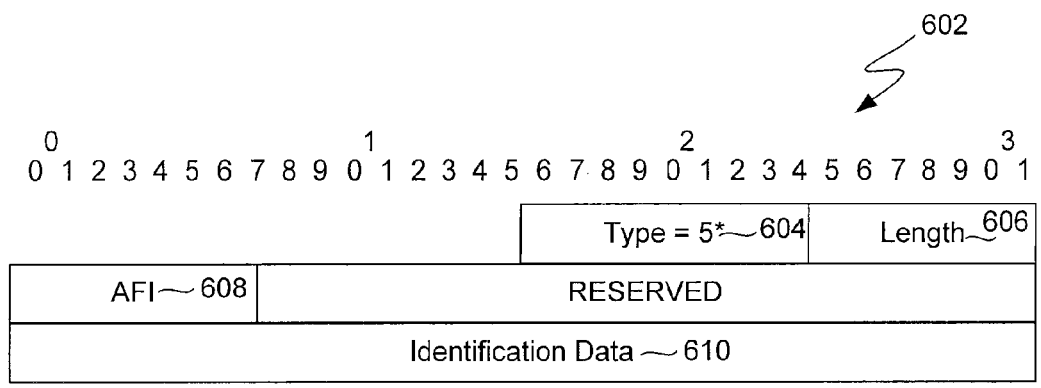
FIG. 6 is a diagram illustrating an example option that may be appended to a Binding Update or Binding Acknowledgement in order to identify a group identifier and/or location identifier.

FIG. 6 is a diagram illustrating an example option that may be appended to a Binding Update or Binding Acknowledgement in order to identify a group identifier and/or location identifier. The option 602 may include a type field 604 that identifies a type of the option 602. For instance, the type may indicate that the option 602 includes a group identifier or location identifier. A length field 606 may indicate the length (e.g., in bytes) of the option 602. An ID_TYPE field 608 may indicate that the identification data field 610 includes either a group identifier or a location identifier. A location identifier may indicate a location such as a geographical location (e.g., city, state, country, zip code, etc.) or logistical location (e.g., indicating a number of hops).

Although example mobility options have been described above with reference to FIGS. 5 and 6, these examples are merely illustrative. Thus, the options may be implemented in other formats. Moreover, the disclosed information may be provided in fewer or a greater number of options. Thus, a Binding Update or Binding Acknowledgement may include any number of options.

Figure 7:
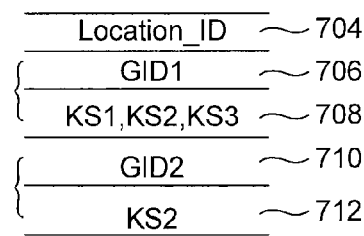
FIG. 7 is a diagram illustrating an example order of a plurality of mobility options in a message such as a Binding Update or Binding Acknowledgement.

FIG. 7 is a diagram illustrating an example order of a plurality of mobility options in a message such as a Binding Update or Binding Acknowledgement. A Binding Update or Binding Acknowledgement message (transmitted in association with Mobile IP registration of a group member or key server with a Home Agent) may include a plurality of mobility options, as shown at 702. In one embodiment, a location identifier 704 option, if present, may appear before group identifier or key server address options. A group identifier option may be followed by a corresponding key server address option including a key server address of one or more key servers. In this example, group identifier GID1 706 is followed by a corresponding key server address option 708, which includes addresses for key server 1 (KS1), key server 2 (KS2), and key server 3 (KS3). Similarly, group identifier GID2 710 is followed by a corresponding key server address option 712, which includes an address for key server 2 (KS2). In this manner, one or more key servers may be identified in association with a particular group.

Figure 8:
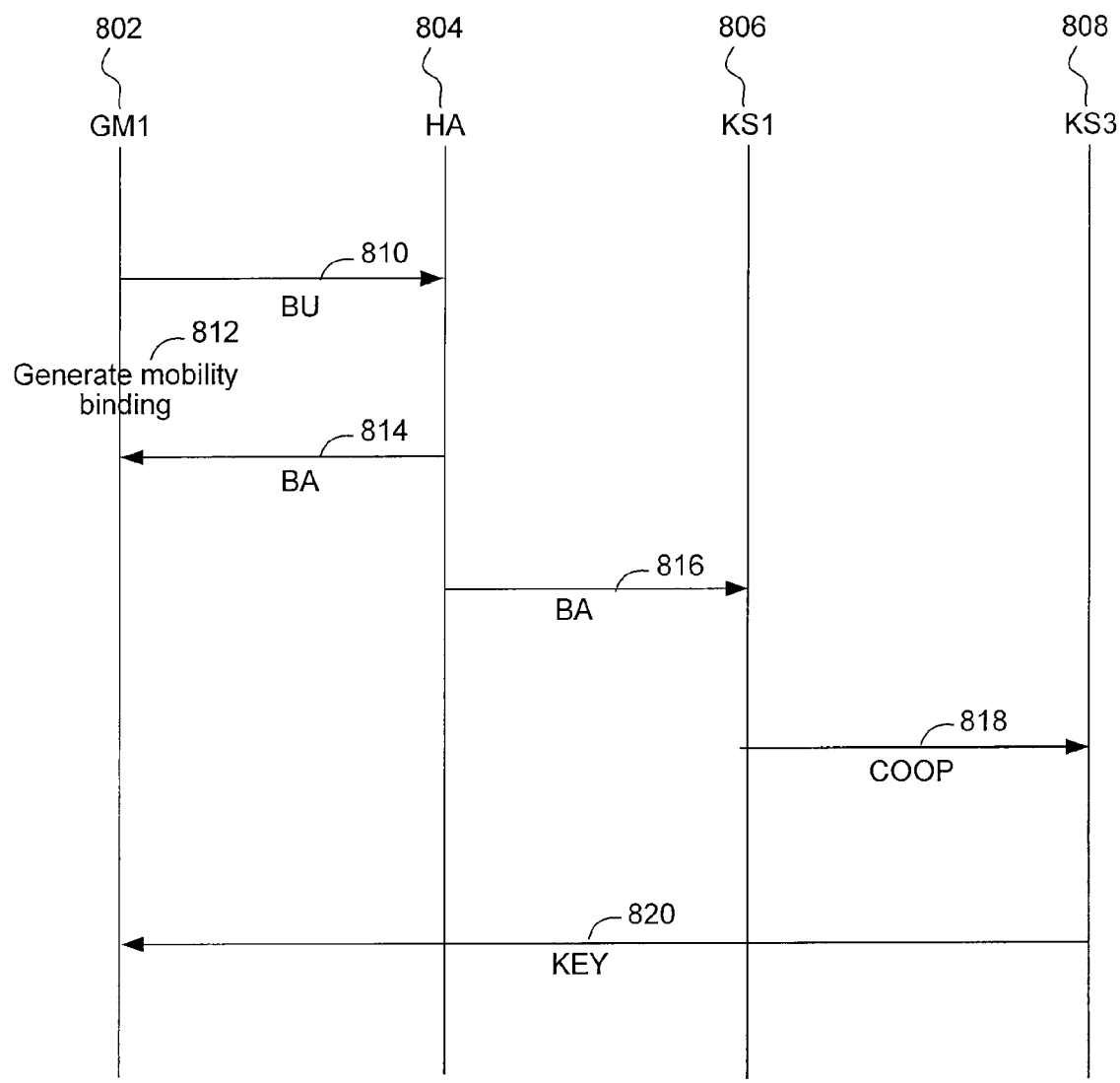
FIG. 8 is a transaction flow diagram illustrating an example control flow when a group member changes its location in accordance with one embodiment.

FIG. 8 is a transaction flow diagram illustrating an example control flow when a group member changes its location in accordance with one embodiment. Processes performed by a group member (GM1), a Home Agent (HA), a first key server (KS1), and a third key server (KS3), are described with reference to vertical lines 802, 804, 806, 808, respectively. As shown in this example, when the group member changes its location, it may re-register with the Home Agent by sending a Binding Update (BU) at 810 to the Home Agent. The Binding Update may identify the previously assigned key server(s) (e.g., by care-of address and/or home address). Upon successfully authenticating the group member, the Home Agent may generate (e.g., update) a mobility binding at 812 by associating the group member with its new care-of address. The Home Agent may then reply by sending a Binding Acknowledgement (BA) at 814 to the group member.

Upon Mobile IP registration of a group member (or a key server) with the Home Agent, the Home Agent may select one of the key servers based upon one or more criterion. For example, the Home Agent may determine which key server(s) are closest to the new location of the group member. For example, the Home Agent may re-assess whether another key server (that serves the same group(s)) would be closer to a particular group member. Thus, the Home Agent may identify one or more key servers that are closest in proximity to the group member. In this example, after the group member has changed its location, the third key server is now closer to the group member than the first key server. As a result, the Home Agent may advise the group member to use the third key server, rather than the first key server. For example, the Home Agent may provide an IP address of the third key server in the Binding Acknowledgement (e.g., in a key server address option). Thus, the Home Agent may provide a list identifying one or more key servers to the group member.

The Home Agent may also notify the previous key server, the first key server, that it is no longer responsible for servicing (e.g., sending rekey information to) the group member. The Home Agent may also notify the previous key server, the first key server, of the identity (e.g., IP address) of the preferred key server, the third key server. The Home Agent may send such a notification to the previous key server immediately, or during a next Binding Acknowledgement. In this example, the Home Agent sends a Binding Acknowledgement at 816 to the first key server, where the Binding Acknowledgement indicates that the first key server is no longer responsible for servicing the group member. The Binding Acknowledgement may also notify the first key server that the third key server is now responsible for servicing the group member. For example, the Binding Acknowledgement may include the IP address of the third key server.

The first key server, upon receiving such a notification, may send a communication such as a COOP message at 818 to the third key server indicating that the third key server is now responsible for servicing the group member. This communication may also identify a care-of address of the group member, as well as identify the group(s) for which the third key server is now responsible for sending key updates to the group member. During a next rekeying event, the third key server may then provide this new key (or modification to a key) to the group member at 820.

Figure 9:
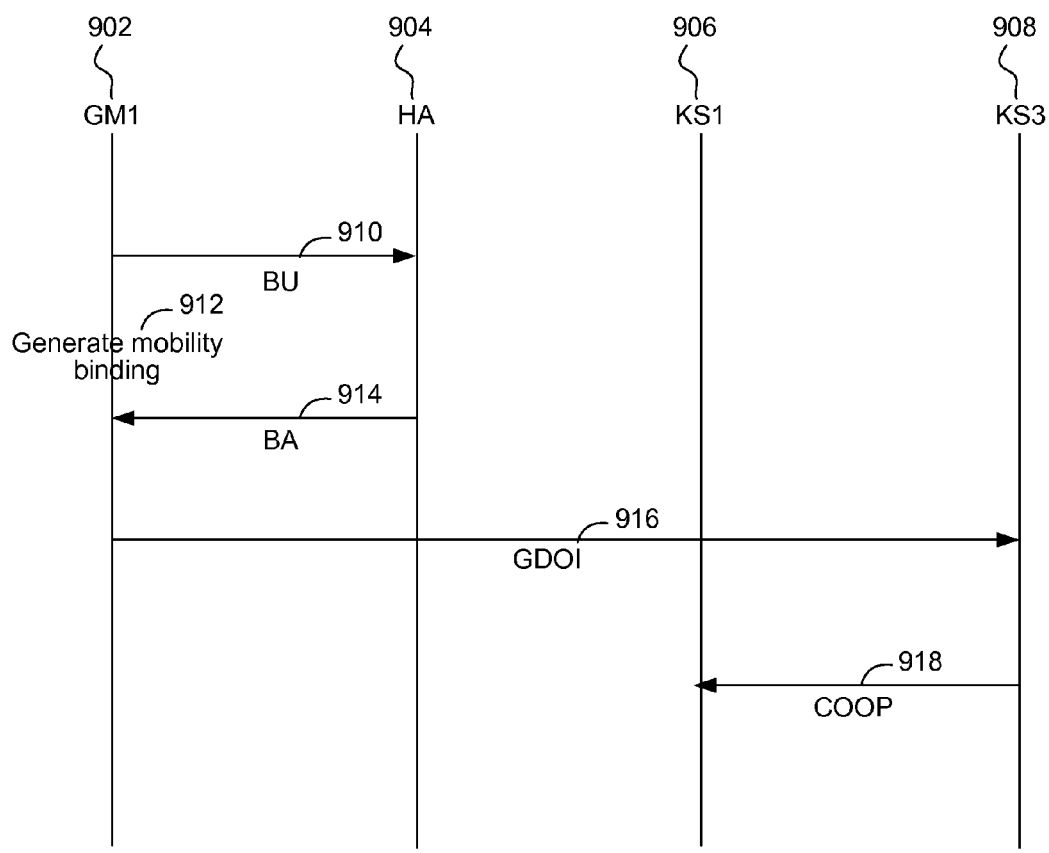
FIG. 9 is a transaction flow diagram illustrating an example control flow when a group member changes its location in accordance with another embodiment.

FIG. 9 is a transaction flow diagram illustrating an example control flow when a group member changes its location in accordance with another embodiment. Processes performed by a group member (GM1), a Home Agent (HA), a first key server (KS1), and a third key server (KS3), are described with reference to vertical lines 902, 904, 906, 908, respectively. As shown in this example, when the group member changes its location, it may re-register with the Home Agent by sending a Binding Update (BU) at 910 to the Home Agent. The Binding Update may identify the previously assigned key server(s) (e.g., by care-of address and/or home address). Upon successfully authenticating the group member, the Home Agent may generate a mobility binding at 912 associating the group member with its care-of address. The Home Agent may then reply by sending a Binding Acknowledgement (BA) at 914 to the group member.

Upon Mobile IP registration of the group member (or a key server) with the Home Agent, the Home Agent may select one of the key servers according to one or more criterion. For example, the Home Agent may determine which key server(s) are closest to the current location of the group member. For example, the Home Agent may re-assess whether another key server would be closer to a particular group member than the key server(s) that are currently servicing the group member. Thus, the Home Agent may identify one or more key servers that are closest in proximity to the group member. For example, a distance between a location or care-of address of a key server and a location or care-of address of a group member may be ascertained. The distance may include a number of hops or a geographical distance (e.g., number of miles). The Home Agent may generate a Binding Acknowledgement according to whether another set of key server(s) is closer to the group member than the key server(s) that were previously assigned to the group member.

In this example, after the group member has changed its location, the third key server is now closer to the group member than the first key server. As a result, the Home Agent may advise the group member to use the third key server, rather than the first key server. For example, the Home Agent may provide an IP address of the third key server in the Binding Acknowledgement (e.g., in a key server address option).

The group member may then register with the third key server at 916 by sending a message such as a GDOI message to the third key server, notifying the third key server of the group member's new location (e.g., care-of address). More particularly, the group member may notify the third key server that the third key server is responsible for sending rekey information to the group member when group cryptography material (e.g., a group key) associated with a particular group (e.g., group A) is modified. This GDOI message may further identify the previous key server, the first key server (e.g., via Home Address and/or care-of address). The third key server may send a communication such as a COOP message at 918 to the first key server indicating that the first key server is no longer responsible for servicing the group member. This communication (e.g., COOP message) may also identify the group(s) for which the first key server is no longer responsible for sending key updates to the group member. During a next rekeying event, the third key server may then provide a new key (or modification to a key) to the group member.

In the examples set forth above with reference to FIG. 8 and FIG. 9, it is assumed that the Home Agent has identified a key server that is closer to a group member than a previously assigned key server. However, where the previously assigned key server remains responsible for servicing the group member, the Home Agent may notify the key server directly of a group member's new care-of address when the group member successfully performs Mobile IP registration to register with the Home Agent.

It is important to note that the disclosed embodiments are merely illustrative, and therefore information may be exchanged via a variety of devices and messaging schemes. For example, in FIG. 8, the Home Agent notifies the previous key server that it is no longer responsible for performing rekeying on behalf of the group member. The previous key server then notifies the new key server that it will be supporting the group member. Similarly, in FIG. 9, the group member registers with the new key server, which then informs the previous key server that it will no longer be supporting the group member. In an alternative embodiment, the Home Agent (or another device) may also send communications directly to the new key server, which may then communicate with the previous key server.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In accordance with various embodiments, the techniques are implemented in software such as an operating system or in an application running on an operating system.

A software or software/hardware hybrid packet processing system in accordance with the disclosed embodiments may be implemented on a general-purpose programmable machine selectively activated or reconfigured by a computer program stored in memory. Such programmable machine may be a network device designed to handle network traffic. Such network devices typically have multiple network interfaces including Ethernet interfaces, for example. Specific examples of such network devices include routers and switches. For example, the packet processing systems may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, various embodiments may be at least partially implemented on a card (e.g., an interface card) for a network device or a general-purpose computing device.

In one embodiment, the network device (e.g., Home Agent) implementing the disclosed embodiments is a router. The router may include one or more line cards. Referring now to FIG. 10, a router 1010 suitable for implementing various embodiments includes a master central processing unit (CPU) 1062, interfaces 1068, and a bus 1015 (e.g., a PCI bus). When acting under the control of appropriate software or firmware, the CPU 1062 is responsible for such router tasks as routing, table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 1062 may include one or more processors 1063 such as a processor from the Motorola family of microprocessors or the MIPS family of microprocessors. In an alternative embodiment, processor 1063 is specially designed hardware for controlling the operations of router 1010. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data packets or data segments over the network and sometimes support other peripherals used with the router 1010. Among the interfaces that may be provided are Ethernet interfaces, frame relay interfaces, cable interfaces, DSL interfaces, token ring interfaces, and the like. In addition, various very high-speed interfaces may be provided such as Fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, other disclosed functionality, etc.

Although the system shown in FIG. 10 is one specific router, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1065) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave traveling over an appropriate medium such as optical lines, electric lines, etc. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. For example, although GET (i.e., GDOI) is referenced herein, the disclosed embodiments may be implemented using a variety of systems and protocols supporting group members and the distribution of group keys by key servers to those group members. As another example, key servers are disclosed as being selected based upon their location with respect to group members. However, it is important to note that other criteria may be used in addition to, or instead of, location. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
receiving a Mobile IP registration request from a group member, the group member being a Mobile Node;
generating a mobility binding for the group member that associates the group member with a care-of address, wherein the group member is a member of one or more groups;
generating a Mobile IP registration reply, the Mobile IP registration reply identifying one or more key servers, each of the one or more key servers serving at least one of the one or more groups and being adapted for distributing group cryptography material to members of each group that is served by the corresponding key server; and sending the Mobile IP registration reply to the group member, thereby enabling the group member to obtain group cryptography material for at least one of the one or more groups from at least one of the one or more key servers to enable the group member to use the group cryptography material to securely communicate with other group members.

2. The method as recited in claim 1, wherein the Mobile IP registration reply further identifies the one or more groups.

3. The method as recited in claim 1, wherein the Mobile IP registration reply identifies at least one of a Home Address or a care-of address of at least one of the one or more key servers.

4. The method as recited in claim 1, further comprising:
receiving a subsequent Mobile IP registration request from the group member;
updating the mobility binding for the group member;
ascertaining whether another key server that serves at least one of the one or more groups is closer to the group member than at least one of the one or more key servers that serves the at least one of the one or more groups;
generating a subsequent Mobile IP registration reply according to whether another key server is closer to the group member; and
sending the subsequent Mobile IP registration reply to the group member.

5. The method as recited in claim 4, wherein the subsequent Mobile IP registration request identifies at least one of a Home Address or a care-of address of at least one of the one or more key servers.

6. The method as recited in claim 4, further comprising:
when it is ascertained that another key server that serves at least one of the one or more groups is closer to the group member than the at least one of the one or more key servers that serves the at least one of the one or more groups, the subsequent Mobile IP registration reply identifies the another key server such that the group member is notified that the another key server is closer to the group member than the at least one of the one or more key servers.

7. The method as recited in claim 1, further comprising:
determining that another key server that serves at least one of the one or more groups is closer to the group member than at least one of the one or more key servers that serves the at least one of the one or more groups; and
notifying the group member that the another key server is closer to the group member than the at least one of the one or more key servers.

8. The method as recited in claim 7, wherein the group member is responsible for notifying the another key server that it is responsible for sending rekey information to the group member when a group key of one of the at least one of the one or more groups is modified.

9. The method as recited in claim 1, further comprising:
ascertaining whether another key server that serves at least one of the one or more groups is closer to the group member than at least one of the one or more key servers that serves the at least one of the one or more groups;
when it is ascertained that another key server that serves at least one of the one or more groups is closer to the group member than the at least one of the one or more key servers that serves the at least one of the one or more groups, notifying the at least one of the one or more key servers that they are no longer responsible for sending rekey information to the group member when a group key of one of the at least one of the one or more groups is modified.

10. The method as recited in claim 1, further comprising:
transmitting a list identifying at least one key server to the group member.

11. The method as recited in claim 10, further comprising:
identifying the at least one key server, wherein the at least one key server is selected in accordance with a location of the at least one key server with respect to a location the group member.

12. The method as recited in claim 1, further comprising:
ascertaining whether another key server that serves at least one of the one or more groups is closer to the group member than at least one of the one or more key servers that serves the at least one of the one or more groups;
when it is ascertained that another key server that serves at least one of the one or more groups is closer to the group member than the at least one of the one or more key servers that serves the at least one of the one or more groups, notifying the another key server that it is responsible for sending rekey information to the group member when group cryptography material of one of the at least one of the one or more groups is modified.

13. The method as recited in claim 1, further comprising:
receiving a second Mobile IP registration request from one of the one or more key servers, each of the one or more key servers being a Mobile Node;
generating a second mobility binding for the one of the one or more key servers that associates the one of the one or more key servers with a second care-of address
generating a second Mobile IP registration reply; and
sending the second Mobile IP registration reply to the one of the one or more key servers.

14. A non-transitory computer-readable medium storing thereon computer-readable instructions, comprising:
instructions for obtaining a Mobile IP registration request received from a group member, the group member being a Mobile Node;
instructions for generating a mobility binding for the group member that associates the group member with a care-of address, wherein the group member is a member of one or more groups;
instructions for generating a Mobile IP registration reply, the Mobile IP registration reply identifying one or more key servers, each of the one or more key servers serving at least one of the one or more groups and being adapted for distributing group cryptography material to members of each group that is served by the corresponding key server; and
instructions for sending the Mobile IP registration reply to the group member, thereby enabling the group member to obtain group cryptography material for at least one of the one or more groups from at least one of the one or more key servers to enable the group member to use the shared key to secure communications with other group members.

15. An apparatus, comprising:
a processor; and
a memory, at least one of the processor or the memory being adapted for:
receiving a Mobile IP registration request from a group member, the group member being a Mobile Node;
generating a mobility binding for the group member that associates the group member with a care-of address, wherein the group member is a member of one or more groups;
generating a Mobile IP registration reply, the Mobile IP registration reply identifying one or more key servers, each of the one or more key servers serving at least one of the one or more groups and being adapted for distributing group cryptography material to members of each group that is served by the corresponding key server; and sending the Mobile IP registration reply to the group member, thereby enabling the group member to obtain group cryptography material for at least one of the one or more groups from at least one of the one or more key servers to enable the group member to use the shared key to secure communications with other group members.

16. An apparatus, comprising:

a processor; and a memory, at least one of the processor or the memory being adapted for:

receiving a Mobile IP registration request by a Home Agent from a key server, the key server being a Mobile Node;

generating by the Home Agent a mobility binding for the key server that associates the key server with a care-of address, the key server serving one or more groups and being adapted for distributing group cryptography material to members of each of the one or more groups that is served by the key server;

generating by the Home Agent a Mobile IP registration reply; and sending by the Home Agent the Mobile IP registration reply to the key server.

17. A method, comprising:

receiving a Mobile IP registration request by a Home Agent from a key server, the key server being a Mobile Node;

generating by the Home Agent a mobility binding for the key server that associates the key server with a care-of address, the key server serving one or more groups and being adapted for distributing group cryptography material to members of each of the one or more groups that is served by the key server;

generating by the Home Agent a Mobile IP registration reply; and sending by the Home Agent the Mobile IP registration reply to the key server.

18. The method as recited in claim 17, wherein the key server is a member of at least one of the one or more groups.

19. The method as recited in claim 17, wherein the Mobile IP registration request identifies a location of the key server.

20. The method as recited in 17, wherein the Mobile IP registration request identifies each of the one or more groups that is served by the key server.

21. The method as recited in claim 17, wherein the Mobile IP registration reply identifies one or more key servers.

22. The method as recited in claim 21, wherein the Mobile IP registration reply further identifies a location associated with each of the one or more key servers.

23. The method as recited in claim 21, wherein the Mobile IP registration reply identifies at least one of a care-of address or a home address of each of the one or more key servers.

24. The method as recited in claim 21, wherein each of the one or more key servers serves at least one of the one or more groups that are served by the key server, wherein the Mobile IP registration reply further identifies the at least one of the one or more groups that is served by each of the one or more key servers.

25. The method as recited in claim 21, wherein the Mobile IP registration reply identifies a set of groups that is served by each of the one or more key servers.

26. The method as recited in claim 17, further comprising:

notifying the key server of a care-of address of one of the members of one of the one or more groups.

* * * * *